United States Patent
Xia et al.

(10) Patent No.: US 6,901,155 B2
(45) Date of Patent: May 31, 2005

(54) WAVELET-ENHANCED AUTOMATED FINGERPRINT IDENTIFICATION SYSTEM

(75) Inventors: Tao Xia, Singapore (SG); Bao Liu, Singapore (SG); Jo Yew Tham, Kuala Lumpur (MY); Lixin Shen, Singapore (SG); Seng Luan Lee, Singapore (SG)

(73) Assignee: National University of Singapore, Singapore (SG)

( * ) Notice: Subject to any disclaimer, the term of this patent is extended or adjusted under 35 U.S.C. 154(b) by 746 days.

(21) Appl. No.: 09/742,405

(22) Filed: Dec. 22, 2000

(65) Prior Publication Data

US 2001/0036300 A1 Nov. 1, 2001

Related U.S. Application Data

(60) Provisional application No. 60/171,582, filed on Dec. 23, 1999.

(51) Int. Cl.⁷ .................................................. G06K 9/00
(52) U.S. Cl. ........................ 382/125; 382/115; 382/116; 382/169; 382/171
(58) Field of Search .................. 382/115–116, 124–127, 382/168–172

(56) References Cited

U.S. PATENT DOCUMENTS

| | | | | |
|---|---|---|---|---|
| 5,799,098 A | * | 8/1998 | Ort et al. | 382/125 |
| 5,822,453 A | * | 10/1998 | Lee et al. | 382/169 |
| 5,832,102 A | * | 11/1998 | Uchida | 382/124 |
| 5,892,838 A | * | 4/1999 | Brady | 382/115 |
| 5,978,495 A | * | 11/1999 | Thomopoulos et al. | 382/124 |
| 6,289,112 B1 | * | 9/2001 | Jain et al. | 382/116 |
| 6,597,802 B1 | * | 7/2003 | Bolle et al. | 382/124 |

* cited by examiner

*Primary Examiner*—Bhavesh M. Mehta
*Assistant Examiner*—Gregory Desire
(74) *Attorney, Agent, or Firm*—Birch, Stewart, Kolasch & Birch, LLP

(57) ABSTRACT

A method and system for performing automated biological identification. The system including a preprocessing module with a histogram transform for locally and globally enhancing biological data such as fingerprints. An enhancement module with a fast smoothing and enhancement function. A feature extraction module with a fingerprint oriented thinning function. A matching module with a resolution-enhanced Hough transform function for fingerprint registration and matching score function.

11 Claims, 5 Drawing Sheets

Flowchart of declared system

Figure 1. Flowchart of declared system

Figure 2

| $P_1$ | $P_2$ | $P_3$ |
|---|---|---|
| $P_8$ | $P$ | $P_4$ |
| $P_7$ | $P_6$ | $P_5$ |

Figure 3

| dir order | 0 | 1 | 2 | 3 | 4 | 5 | 6 |
|---|---|---|---|---|---|---|---|
| 0 | (-3,0) | (-2,0) | (-1,0) | (0,0) | (1,0) | (2,0) | (3,0) |
| 1 | (-3,-1) | (-2,0) | (-1,0) | (0,0) | (1,0) | (2,0) | (3,1) |
| 2 | (-3,-1) | (-2,-1) | (-1,0) | (0,0) | (1,0) | (2,1) | (3,1) |
| 3 | (-3,-2) | (-2,-1) | (-1,-1) | (0,0) | (1,1) | (2,1) | (3,2) |
| 4 | (-3,-3) | (-2,-2) | (-1,-1) | (0,0) | (1,1) | (2,2) | (3,3) |
| 5 | (-2,-3) | (-1,-2) | (-1,-1) | (0,0) | (1,1) | (1,2) | (2,3) |
| 6 | (-1,-3) | (-1,-2) | (0,-1) | (0,0) | (0,1) | (1,2) | (1,3) |
| 7 | (-1,-3) | (0,-2) | (0,-1) | (0,0) | (0,1) | (0,2) | (1,3) |
| 8 | (0,-3) | (0,-2) | (0,-1) | (0,0) | (0,1) | (0,2) | (0,3) |
| 9 | (1,-3) | (0,-2) | (0,-1) | (0,0) | (0,1) | (0,2) | (-1,3) |
| 10 | (1,-3) | (1,-2) | (0,-1) | (0,0) | (0,1) | (-1,2) | (-1,3) |
| 11 | (2,-3) | (1,-2) | (1,-1) | (0,0) | (-1,1) | (-1,2) | (-2,3) |
| 12 | (3,-2) | (2,-1) | (1,-1) | (0,0) | (-1,1) | (-2,1) | (-3,2) |
| 13 | (3,-1) | (2,-1) | (1,0) | (0,0) | (-1,0) | (-2,1) | (-3,1) |
| 14 | (3,-1) | (2,0) | (1,0) | (0,0) | (-1,0) | (-2,0) | (-3,1) |
| 15 | (3,0) | (2,0) | (1,0) | (0,0) | (-1,0) | (-2,0) | (-3,0) |

Figure 4

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 1 | 1 | 1 | 0 | 1 | 1 | 0 | 0 | 1 | 1 | 1 | 1 | 0 | 1 | 0 | 0 |
| 1 | 1 | 1 | 1 | 1 | 1 | 1 | 1 | 1 | 0 | 1 | 1 | 1 | 0 | 1 | 0 | 0 |
| 2 | 1 | 1 | 1 | 1 | 1 | 1 | 1 | 1 | 0 | 1 | 1 | 1 | 0 | 1 | 1 | 1 |
| 3 | 0 | 1 | 1 | 1 | 1 | 1 | 1 | 1 | 0 | 1 | 1 | 1 | 0 | 1 | 1 | 1 |
| 4 | 1 | 1 | 1 | 1 | 1 | 1 | 1 | 1 | 1 | 1 | 1 | 1 | 1 | 1 | 1 | 0 |
| 5 | 1 | 1 | 1 | 1 | 1 | 1 | 1 | 1 | 1 | 1 | 1 | 1 | 1 | 1 | 0 | 0 |
| 6 | 0 | 1 | 1 | 1 | 1 | 1 | 1 | 1 | 0 | 1 | 1 | 1 | 0 | 1 | 1 | 1 |
| 7 | 0 | 1 | 1 | 1 | 1 | 1 | 1 | 1 | 0 | 1 | 1 | 1 | 0 | 1 | 1 | 1 |
| 8 | 1 | 0 | 1 | 0 | 1 | 1 | 1 | 0 | 1 | 1 | 1 | 1 | 1 | 1 | 1 | 0 |
| 9 | 1 | 1 | 1 | 1 | 1 | 1 | 1 | 0 | 1 | 1 | 1 | 1 | 1 | 1 | 1 | 0 |
| A | 0 | 0 | 1 | 1 | 1 | 1 | 1 | 1 | 1 | 1 | 1 | 1 | 1 | 1 | 1 | 1 |
| B | 0 | 0 | 1 | 1 | 1 | 1 | 1 | 1 | 1 | 1 | 1 | 1 | 1 | 1 | 1 | 1 |
| C | 0 | 0 | 1 | 0 | 1 | 1 | 1 | 0 | 1 | 1 | 1 | 1 | 1 | 1 | 1 | 0 |
| D | 1 | 1 | 1 | 0 | 1 | 1 | 1 | 0 | 1 | 1 | 1 | 1 | 1 | 1 | 1 | 0 |
| E | 0 | 0 | 1 | 0 | 1 | 1 | 1 | 0 | 1 | 1 | 1 | 1 | 1 | 1 | 1 | 1 |
| F | 0 | 0 | 1 | 0 | 1 | 1 | 1 | 0 | 1 | 1 | 1 | 1 | 1 | 1 | 1 | 1 |

Figure 5

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 1 | 1 | 1 | 0 | 1 | 1 | 0 | 0 | 1 | 1 | 0 | 0 | 0 | 1 | 0 | 0 |
| 1 | 1 | 1 | 1 | 1 | 1 | 1 | 1 | 1 | 0 | 1 | 0 | 0 | 0 | 1 | 0 | 0 |
| 2 | 1 | 1 | 1 | 1 | 1 | 1 | 1 | 1 | 1 | 1 | 1 | 1 | 1 | 1 | 1 | 1 |
| 3 | 0 | 1 | 1 | 1 | 1 | 1 | 1 | 1 | 0 | 1 | 1 | 1 | 0 | 0 | 0 | 0 |
| 4 | 1 | 1 | 1 | 1 | 1 | 1 | 1 | 1 | 1 | 1 | 1 | 1 | 1 | 1 | 1 | 1 |
| 5 | 1 | 1 | 1 | 1 | 1 | 1 | 1 | 1 | 1 | 1 | 1 | 1 | 1 | 1 | 1 | 1 |
| 6 | 0 | 1 | 1 | 1 | 1 | 1 | 1 | 1 | 1 | 1 | 1 | 1 | 1 | 1 | 1 | 1 |
| 7 | 0 | 1 | 1 | 1 | 1 | 1 | 1 | 1 | 0 | 0 | 1 | 1 | 0 | 0 | 0 | 0 |
| 8 | 1 | 0 | 0 | 0 | 1 | 1 | 0 | 0 | 1 | 1 | 1 | 1 | 1 | 1 | 1 | 1 |
| 9 | 1 | 1 | 1 | 1 | 1 | 1 | 1 | 1 | 1 | 1 | 1 | 1 | 1 | 1 | 1 | 1 |
| A | 1 | 1 | 1 | 1 | 1 | 1 | 1 | 1 | 1 | 1 | 1 | 1 | 1 | 1 | 1 | 1 |
| B | 1 | 1 | 1 | 1 | 1 | 1 | 1 | 1 | 1 | 1 | 1 | 1 | 1 | 1 | 1 | 1 |
| C | 0 | 0 | 0 | 0 | 1 | 1 | 0 | 0 | 1 | 1 | 1 | 1 | 1 | 1 | 1 | 1 |
| D | 1 | 1 | 1 | 1 | 1 | 1 | 1 | 1 | 1 | 1 | 1 | 1 | 1 | 1 | 1 | 1 |
| E | 0 | 0 | 1 | 1 | 1 | 0 | 1 | 1 | 1 | 1 | 1 | 1 | 1 | 1 | 1 | 1 |
| F | 0 | 0 | 1 | 1 | 0 | 0 | 1 | 1 | 0 | 0 | 1 | 1 | 0 | 0 | 1 | 1 |

WAVELET-ENHANCED AUTOMATED FINGERPRINT IDENTIFICATION SYSTEM

This application claims priority on provisional Application No. 60/171,582 filed on Dec. 23, 1999, the entire contents of which are hereby incorporated by reference.

BACKGROUND OF THE INVENTION

1. Field of the Invention

The present invention relates to an improved method for characterizing, matching, and identifying biologically unique features such as fingerprints and irises. More specifically, it relates to methods for enhancement of digital images, fast directional convolution and fingerprint-oriented ridge thinning, matching and identification of fingerprints.

2. Description of Related Art

As our society is increasingly electronically-connected, automated personal authentication becomes more important than ever. Traditional techniques, such as those using personal identification numbers (PIN) or passwords, will not satisfy demanding security requirements as they are incapable of differentiating between an authorized person and an impostor. In fact, these techniques can only verify the correctness of the PIN input by a person, but not authenticate the true identity of the authorized person.

To overcome this shortcoming in personal authentication, a number of biometric techniques have been investigated. Biometric authentication capitalizes on some unique bodily features or characteristics of a person, such as fingerprint, voice, hand geometry, face, palm, and iris pattern. Among these biometric features, automated fingerprint identification system (AFIS) has provided the most popular and successful solution, mainly due to the uniqueness of fingerprints and the historical legal aspect of fingerprinting for law enforcement.

A robust and efficient AFIS however, comes with many challenges. The AFIS must be able to differentiate two different fingerprints that may be seemingly identical to the untrained eye. The uniqueness of a fingerprint is characterized by the finely embedded details (called minutiae) of the print, and its overall ridge pattern and density. From a legal standpoint, under Singapore's criminal laws, two fingerprints that contain 16 or more reliably matching minutiae are registered as originating from the same finger of the same person. As a result, a successful AFIS must have strong discrimination power, robustness to certain degrees of deformation in the fingerprint, and fast (or even real-time) processing performance.

Typically, AFIS includes features such as fingerprint image pre-enhancement, orientation filtering, ridge thinning, fingerprint registration and weighted matching score computation. The need for fingerprint image pre-enhancement arises because regardless of the acquisition method and device (either from fingerprint cards, or from fingerprint readers such as optical sensors, or more recently, semiconductor sensors) fingerprints are susceptible to various forms of distortion and noise, including blotches caused by the input environment, skin disease (cuts, and peeling skin), and skin condition (either too wet among younger people, or too dry among elder people). As a result, fingerprint image enhancement is needed to suppress noise, improve contrast, and accentuate the predominant orientation information of the fingerprint.

Orientational filters are generally used for image enhancement according to the local directions of fingerprint ridges, which are obtained from the orientation field of the fingerprint image. Prior art for pre-enhancing includes finding an accurate estimation of the orientation field using some advanced but complicated models and employing a global enhancement technique (e.g., M. Kass et al., "Analyzing Oriented Patterns", Comput. Vis. Graphics Image Process, 37, 362–385, 1987. N. Ratha et al., "Adaptive Flow Orientation Based Feature Extraction in Fingerprint Images", Pattern Recognition, 28 (11), 1657–1672, 1995. Vizcaya et al., "A Nonlinear Orientation Model for Global Description of Fingerprints", Pattern Recognition, 29 (7), 1221–1231, 1996.). Nevertheless, these techniques are usually computationally expensive, and hence less suitable for most AFIS solutions that require real-time processing. Another class of pre-enhancement techniques first accentuates the orientation information and then estimates the orientation field. The most famous technique being the NIST's FFT-based method (e.g., G. T. Candela, et al., "PCASYS-A Pattern-Level Classification Automation System For Fingerprints", National Institute of Standards and Technology, Visual Image Processing Group, Aug. 1995.), and also some other variants of the FFT-based method (e.g., Sherlock et al., "Fingerprint Enhancement by Directional Fourier Filtering, Proc." IEE Visual Image Signal Processing vol. 141 (2), 87–94, April 1994).

After the pre-enhancement, orientation filtering is also commonly used to further enhance an input fingerprint image. Many filters have been designed for fingerprint image enhancement (e.g. Gorman et al., "An Approach To Fingerprint Filter Design", Pattern Recognition, Vol. 22 (1), 29–38, 1989; B. M. Mehtre, Fingerprint image analysis for automatic identification, Machine Vision and Applications, 6, 124–139, 1993; Kamei et al., "Image Filter Design For Fingerprint Enhancement", Proc. International Symposium on Computer Vision, 109–114, 1995; and Maio et al., "Direct Gray-Scale Minutiae Detection In Fingerprints", *IEEE Transactions on PAMI*, Vol. 19, No. 1, 27–40, January 1997), adopted a method to filter the image using a class of orientation filters, and then derive the fingerprint minutiae from the gray-scale image directly. Such a method required intensive computations (e.g., Kasaei et al., "Fingerprint Feature Enhancement Using Block-Direction On Reconstructed Images", TENCON '97. IEEE Region 10 Annual Conference, Speech and Image Technologies for Computing and Telecommunications., Proceedings of IEEE, vol. 1, 303–306, 1997 attempted to avoid the use of a large class of filters.) To do so, the original image is first rotated to a particular direction to perform the orientation filtering, and then rotated back to the original direction. This rotation process introduces loss of accuracy due to the quantization noise of rotating a discrete image, which may subsequently result in the detection of false minutiae.

Regarding ridge thinning, the prior art has consistently shown that the most effective and robust approach for fingerprint feature extraction is probably using binarization. With this approach, the fingerprint ridges are thinned into binary lines of width of only one pixel before the minutiae are extracted. Some prior art avoids binarization by performing the feature extraction process directly on the gray-scale image (e.g., Maio et al., "Direct Gray-Scale Minutiae Detection In Fingerprints", *IEEE Transactions on PAMI*, Vol. 19, No. 1, 27–40, January 1997). Such an approach, however, has the drawbacks of missing minutiae and inaccurate minutiae position and direction. Further, many powerful thinning algorithms have been developed for Chinese character recognitions but they are generally not applicable for thinning ridges in fingerprint images (e.g. Chen et al., "A Modified Fast Parallel Algorithm For Thinning Digital Patterns", Pattern Recognition Letters, 7, 99–106, 1988; R. W. Zhou, "A Novel Single-Pass Thinning Algorithm And An Effective Set Of Performance Criteria", Pattern Recognition Letters, 16, 1267–1275, 1995; and Zhang, "Redundancy Of Parallel Thinning", Pattern Recognition Letters, Vol. 18, 27–35, 1997).

The conventional art includes many methods of fingerprint registration. Among them, minutia-based methods are the most popular approaches (e.g. Ratha et al., "A Real-Time Matching System For Large Fingerprint Databases", IEEE Trans. PAMI, 18 (8), 799–813, Aug., 1996). Such methods make use of the positional and orientational information of each minutia (e.g. Ratha et al., "A Real-Time Matching System For Large Fingerprint Databases", IEEE Trans. PAMI, 18 (8), 799–813, Aug., 1996; Hrechak et al., "Automated Fingerprint Recognition Using Structural Matching", Pattern Recognition, 23(8), 893–904, 1990; Wahab et al., "Novel Approach To Automated Fingerprint Recognition", Proc. IEE Visual Image Signal Processing, 145(3), 160–166, 1998; and Chang et al., "Fast Algorithm For Point Pattern Matching: Invariant To Translations, Rotations And Scale Changes", Pattern Recognition, 30(2) 311–320, 1997), or possibly together with a segment of ridge associated with the minutia (e.g. Jain et al., "An Identity-Authentication System Using Fingerprint", Proc. IEEE, 85(9), 1365–1388, 1997). Some minutia-based methods implement registration based on only a few minutiae. These methods are usually simple and fast in computation. However, since these methods depend mainly on the local information of a fingerprint, they cannot handle well the influence of fingerprint deformation and may provide an unsatisfied registration.

To overcome this problem, some other methods that exploit the global features of the prints have been developed. A typical example of such methods is to use the generalized Hough transform (Ratha et al., "A Real-Time Matching System For Large Fingerprint Databases", IEEE Trans. PAMI, 18 (8), 799–813, Aug., 1996) to perform the registration. This approach allows consideration of the contribution of all the detected minutiae in the prints, and is efficient in computation.

In the weighted matching score computation, the matching score is the final numerical figure that determines if the input print belongs to an authorized person by comparing the score against a predetermined security threshold value. Conventionally, the most used formula for matching score computation is given by the ratio of the number of matched minutiae to the product of the numbers of the input and template minutiae. For example, suppose that D minutiae are found to be matching for prints P and Q. A matching score is then determined using the equation $$S = \sqrt{\frac{D^2}{MN}},$$

where M and N are the number of the detected minutiae of P and Q respectively. This way of computing the matching score is simple and has been accepted as reasonably accurate.

However, such a matching score may be unreliable and inconsistent with respect to a predetermined threshold. There are situations where two non-matching prints can have a relatively high count of matching minutia, as compared with a pair of matching prints. This results in relatively close matching scores, which also means that the discrimination power to separate between matching and non-matching prints can be poor for a chosen security threshold value.

Therefore a demand exists to provide a method or a system for characterizing, matching and identifying fingerprints or other biologically unique features, which improves on the above mentioned problems of AFIS regarding image data pre-enhancement, orientation filtering, ridge thinning, fingerprint registration and weighted matching score computation.

SUMMARY OF THE INVENTION

It is the object of the present invention to provide a method or a system for characterizing, matching and identifying fingerprints or other biologically unique features, which improves on the AFIS and includes image data pre-enhancement, orientation filtering, ridge thinning, fingerprint registration and weighted matching score computation.

These advantages are achieved by a biological data matching system including an image reader, which acquires personal biological data; a template of biological data; a pre-enhancing unit adapted to pre-enhance the personal biological image data according to local areas of contrast; an image smoothing and enhancement filter for enhancing said pre-enhanced image data; an orientation data thinner for removing false data in the personal biological image data; a registration unit for aligning the personal biological image data with the template image data and a matching score unit for determining if the biological data matches the template print. Further, the personal biological data may be a fingerprint, iris, voice, hand geometry, face or palm pattern, etc.

The advantages are further achieved by a finger print minutiae extraction method including acquiring fingerprint image data; partitioning the fingerprint image data into at least one data block corresponding to a local area of the image; generating a histogram function of a contrast level of said image data corresponding to said data blocks; and performing a histogram transformation of the histogram function. Further, the histogram transformation is adapted to the contrast level of the local area of the fingerprint image data and pre-enhanced fingerprint image data is generated with local enhancement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 depicts an 8-neighborhood of pixel P;

FIG. 3 depicts a table of offset coordinates of directional convolution for filter with length 7 and 16 possible directions;

FIG. 4 depicts a lookup table ($LUT_1$) for fingerprint-oriented thinning; and

FIG. 5 depicts a lookup table (LUT$_2$) for fingerprint-oriented thinning.

DETAILED DESCRIPTION OF THE INVENTION

Figure 1:
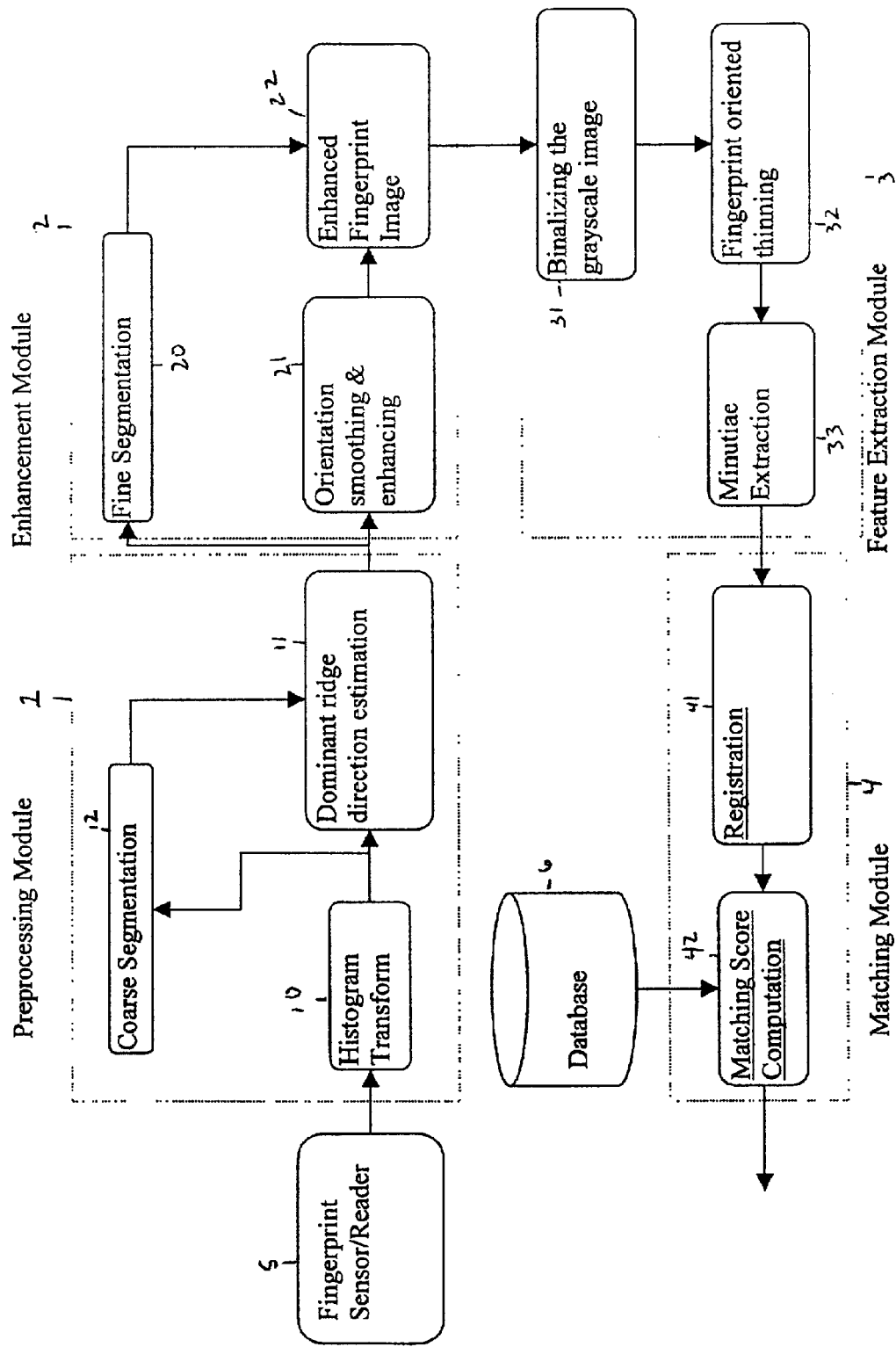
FIG. 1 illustrates a flow chart of the AFIS according to the present invention.

The invention is a method and system for performing AFIS with various features that contribute to a significant performance improvement to two of the most important aspects of an AFIS: efficiency (fast processing), and reliability (accuracy and robustness to variations in input fingerprints). In particular, these features include a histogram pre-enhancement method, fast smoothing and enhancement method for fingerprint images, a fingerprint-oriented thinning methods, a modified Hough transform for fingerprint registration, and an improved matching score computation method.

It is noted that while the specification discusses the invention in relation to fingerprints, the invention is not limited to an application for fingerprints and may also be used for other data image processing and matching such as iris, voice, hand geometry, face and palm patterns.

As illustrated in the FIG. 1, the system includes four modules: a preprocessing module 1, an enhancement module 2, a feature extraction module 3, and a matching module 4. The preprocessing module 1 pre-enhances an input fingerprint image to remove some noise caused by the fingerprint acquisition device or method 5 and removes the dominant ridge directions. The enhancement module 2 further removes noise and accentuates the desired features of the input fingerprint image so as to provide a higher quality image for the other processing units. The feature extraction module 3 extracts all the fingerprint minutiae that are unique and consistent features of an individual, and provides the basis for classification and identification. The matching module 4, implements fingerprint minutiae matching and fingerprint identification and determines whether or not a fingerprint matches a template fingerprint. The template fingerprint may be stored in a database 6.

The preprocessing module 1 includes a histogram transformer 10, dominant ridge direction estimator 11 and coarse segmentation unit 12. The histogram transformer 10 receives finger print images from a finger print sensor/reader 5 or other data scanner or acquirer well known in the art. The dominant ridge direction estimator 11 and coarse segmentation device 12 receive the transformed fingerprint image data. The coarse segmentation 12 outputs the processed coarse segmentation image data to the dominant ridge direction estimator 11 which performs the estimation using the processed coarse segmentation image data and the transformed fingerprint image data.

The enhancement module 2 includes a fine segmentation unit 20, an orientation smoothing and enhancing unit 21 and an enhanced fingerprint image unit 22. The fine segmentation unit 20 and orientation smoothing and enhancing unit 21 receive the image data from the dominant ridge direction estimator 11 and process the image data in parallel. Both the fine segmentation unit 20 and orientation smoothing and enhancing unit 21 deliver processed data to the enhanced fingerprint image unit 22 which uses the processed data to further enhance the image data.

The feature extraction module 3 includes a binalizing grayscale image unit 31, a fingerprint oriented thinning unit 32, and a minutiae extractor 33. The binalizing grayscale image unit 31 receives enhanced image data from the enhancement module 2 and outputs binalized grayscale image data to the fingerprint oriented thinning unit 32. The fingerprint oriented thinning unit 32 outputs thinned image data to the minutiae extractor 33 for processing.

The matching module includes a fingerprint registration unit 41 and a matching score computation unit 42. The fingerprint registration unit 41 receives minutia data from the feature extraction module 3 and aligns the current fingerprint against each of the template fingerprints in the database 6. The matching score computation unit 42 provides a numerical figure that represents the degree of matching between the current fingerprint and a template fingerprint in the database 6. The AFIS stores the template fingerprints and personal information of each person as a record in the database 6.

During verification or identification, the unique features of a person's fingerprint are extracted, and searched against the template fingerprints in the database 6.

The histogram transform 10 of the preprocessing module 1 performs the pre-enhancement histogram transformation of the finger print image data using a simple but effective method including specially designed histograms tailored to the statistical information of fingerprint images. Unlike conventional histogram equalization methods that use constant functions, a special function is used for global/local enhancement and adapts automatically to the histogram characteristics of each input fingerprint. The method can be implemented fast enough for on-line processing, and also gives better performance than approaches in existing systems such as in Jain et al., "On-Line Fingerprint Verification", IEEE Trans. On Pattern Recognition and Machine Intelligence, 19 (4), 302–314, 1997.

The histogram transform 10 performs the following pre-enhancement functions. The fingerprint image is partitioned into image blocks of size $S_b \times S_b$. A block may be formed that encompasses the entire fingerprint image or several blocks may be formed with each block encompassing only portions of the image. Histograms of pixel intensity on a pixel by pixel basis are generated for each block. The corresponding histogram function is also constructed for each block. Assuming that the histogram function for an image block is g(x), the histogram transformer 10 maps histogram function of the image to a specific function according to the following mapping $$x \mapsto \arg\min_y \left\{ y \mid \int_0^x g(t)dt < f(y) \right\}$$

where f(x) is target histogram function. The target histogram function has low value at the mid-point and has a high value at the endpoint of the interval. An example of such function is $$f(x) = N_b \times \left(x - \frac{M}{2}\right)^2 \Big/ \int_0^M \left(x - \frac{M}{2}\right)^2 dx,$$

where M is the maximum value of possible intensity of pixel, such as 256 for 8-bit per pixel fingerprint images, and $N_b$ is the number of pixels in the image/block, such as 256 for block of size 16×16. Of course, the function f(x) can be optimized to some other suitable functions of similar type.

Such a histogram transformation can be either global for the entire image (by setting the block to be the entire image), or local for a portion of the image (using smaller blocks). When several blocks that are smaller than the image are used to partition the fingerprint image data, a localization property of the transformation operator exists. That is the histograms, corresponding histogram functions and transformations are generated for a sub-section or local area of the fingerprint image. Thus, the pre-enhancement can adapt to different contrast levels at different parts of the image and areas of differing contrast levels may be processed more specifically. This subsequently allows better coarse segmentation of the image according to the mean and variance values of each image block. Also, image blocks that contain actual fingerprint ridges but are still blurred after the processing are marked as background blocks, which are ignored so as to accelerate the pre-processing module.

The coarse segmentation 12 of preprocessing module 1 performs coarse segmentation on every $S_b \times S_b$ block. The coarse segmentation unit 12 identifies a block as a foreground block or a background block by comparing the mean value and variance of the block with predetermined threshold and generates tags of every block. The tags have values 1 for a foreground block or 0 for a background block.

The dominant ridge direction estimator 11 in preprocessing module 1 performs dominant ridge direction estimation according to an algorithm and using the tags generated by coarse segmentation unit 12 and the pre-enhanced image data generated by histogram transform 10. Only blocks with a tag value of 1 are processed in the dominant ridge direction estimator 11. The output of preprocessing module 1 is the index of one of 16 discrete directions generated by dominant ridge direction estimator 12 and output image generated by histogram transform 10. An example of a dominant ridge estimation algorithm is that used in K. Jain, and H. Lin, "On-Line Fingerprint Verification, IEEE Trans. On Pattern Recognition And Machine Intelligence", 19 (4), 302–314, 1997. Other suitable algorithms and processing methods may also be used.

Figure 2:
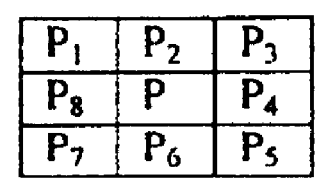

Using the output of the pre-processing module 1, the fine segmentation unit of enhancement module 2 analyzes the smoothness of discrete direction of each foreground block and the corresponding 8-neighbourhood blocks of the foreground block. The 8 neighbors of the foreground block are arranged the as same as the pixels are depicted in FIG. 2. If the difference of discrete direction of a foreground block between the average direction of 8-neighbor blocks is greater than a predetermined threshold, the foreground block is segmented as a background block and the tag of this block is assigned to 0.

The orientation smoothing and enhancing unit 21 of the enhancement module 2 performs orientation filtering using two convolution processes. A smoothing process and an enhancing process is imposed on every foreground block image. First, the smoothing convolution for all foreground blocks occurs. Then, the foreground blocks are enhanced. The convolution is a directional convolution for a 2-dimensional digital image, and includes a convolution of the filter (low pass filter for smoothing and high pass filter for enhancing, respectively) with the current block image data by a directional filter. The convolution is implemented by imposing on every pixel within the block the following algorithm:

$$g(i, j, k) = \sum_{l=1}^{M} f(i + y_{offset}(l), j + x_{offset}(l)) \times h(l)$$

where g(i,j,k) is the output of image intensity at location (i,j); k is index of the dominant direction $\alpha_k = k \times \pi/16$ of current block for smoothing processing and k is an index of the perpendicular direction of dominant direction of current block for enhancing processing, and h(l) is the low pass filter with 7-tap for smoothing convolution and the high pass filter with 7-tap for enhancing convolution, respectively. The offset coordinates ($x_{offset}$, $y_{offset}$) corresponding to discrete direction $\alpha_k$ are listed in FIG. 3.

The enhanced fingerprint image unit 22 sets all pixels of background block marked by fine segmentation unit 20 to 0 the output of orientation smoothing and enhancing unit 21 and produces an enhanced fingerprint image.

In the feature extraction module 3, the binalizing grayscale image unit 31 and minutiae extractor 33 are standard algorithms used in image processing (e.g. S. Kasaei, and M. Deriche, "Fingerprint Feature Enhancement Using Block-Direction On Reconstructed Images", TENCON '97. IEEE Region 10 Annual Conference. Speech and Image Technologies for Computing and Telecommunications., Proceedings of IEEE, vol. 1, 303–306, 1997.

The input and output of binalizing grayscale image unit 31 are grayscale image and a black/white image, respectively. The input of minutiae extractor 33 is a black/white image with one-pixel width curve/ridge and the output of minutiae extractor 33 is a set of minutiae information in which there are attributes of one minutiae including the coordinate of minutiae and the direction of this minutiae.

The fingerprint oriented thinning unit 32 of the feature extraction module 3 processes the output of the binalizing grayscale image unit 31 giving special consideration to the unique properties of fingerprint ridges and minutiae. Unlike character recognition applications, a critical problem in fingerprint recognition application is the formation of false connections that incorrectly link up two adjacent disjoint ridges. These false connections need to be removed, as they will subsequently introduce false minutia and impair the accuracy of the matching module 4. The invention incorporates a set of rules that redefine the behavior of the thinning algorithm such that there are much fewer false connections after the thinning process.

The fingerprint oriented thinning unit 32 processes fingerprint data by using an algorithm to apply $LUT_1$ and $LUT_2$, as shown in FIGS. 4 and 5, respectively, to each pixel foreground pixel P. An example of an algorithm that may be used is found in Chen et al., "A Modified Fast Parallel Algorithms For Thinning Digital Patterns", Pattern Recognition Letters, 7, 99–106, 1988. Other suitable algorithms may also be used.

The LUTs are formed using the following rules. Let A(P) be the number of 0–1 (binary transition) patterns in the order set $P_1, P_2, P_3, P_4, P_5, P_6, P_7, P_8, P_1$, where $P_i$, i=1, . . . ,8, are the 8-neighbors of the foreground pixel P in a clockwise direction (see FIG. 2), and B(P) is the number of nonzero neighbors of P. The following rules are applied.

For $2 \leq B(P) \leq 7$, we choose either

1. A(P)=1,
   If $P_1{}^*P_3{}^*P_5=0$ and $P_3{}^*P_5{}^*P_7=0$ then $LUT_1(P)=0$;
   If $P_1{}^*P_3{}^*P_7=0$ and $P_1{}^*P_5{}^*P_7=0$ then $LUT_2(P)=0$; or 2. A(P)=2,
   If $P_1{}^*P_3=1$ and $P_5+P_6+P_7=0$ then $LUT_1(P)=0$;
   If $P_3{}^*P_5=1$ and $P_1+P_7+P_8=0$ then $LUT_1(P)=0$;
   If $P_1{}^*P_7=1$ and $P_3+P_4+P_5=0$ then $LUT_2(P)=0$;
   If $P_5{}^*P_7=1$ and $P_1+P_2+P_3=0$ then $LUT_2(P)=0$.

The following new rules are incorporated into the new algorithm:

If $P_1{}^*P_7{}^*P_8=1$ and $P_2+P_6>0$ and $P_3+P_5=0$ then $LUT_1(P)=0$;

If $P_5{}^*P_6{}^*P_7=1$ and $P_4+P_8>0$ and $P_1+P_3=0$ then $LUT_1(P)=0$;

If $P_1{}^*P_2{}^*P_3=1$ and $P_4+P_8>0$ and $P_5+P_7=0$ then $LUT_2(P)=0$; and

If $P_3{}^*P_4{}^*P_5=1$ and $P_2+P_6>0$ and $P_1+P_7=0$ then $LUT_2(P)=0$.

The algorithms listed above in rule groups 1 and 2 can be found in Chen et al., "A Modified Fast Parallel Algorithm For Thinning Digital Patterns", Pattern Recognition Letters, 7, 99–106, 1988. Rule groups 1 and 3 are designed for thinning of character images while the new rules are designed for the thinning of biological data such as fingerprints. The set of new rules not only reduces the number of false connections, but also significantly cuts down the number of computations because during each iteration, the fingerprint oriented thinning unit 32 is capable of removing more pixels than other conventional methods.

The fingerprint oriented thinning unit 32 performs the following iteration on each foreground pixel P. If the result of the lookup table, $LUT_1$, as shown in FIG. 4 is equal to zero, then the pixel P is removed by classifying it as background. The same procedure is then repeated using another lookup table, $LUT_2$, as shown in FIG. 5. This process is iterated on all foreground pixels until no pixels can be removed.

The fingerprint registration unit 41 in the matching module 4 has significant affect on the performance of the entire AFIS system. During registration, the current fingerprint is aligned against each template fingerprint in the database 6. The database 6 may contain one or more than one templates. The invention performs fingerprint image registration using a resolution-enhanced generalized Hough transform.

The generalized Hough transform is defined as follows (Ratha et al., "A Real-Time Matching System For Large Fingerprint Databases", IEEE Trans. PAMI, 18 (8), 799–813, August 1996): Let P and Q denote the minutia data sets extracted from an input fingerprint image and a template, respectively. Usually, P and Q can be organized as $P=\{(p_x^1, p_y^1, \alpha^1), \ldots, (p_x^M, p_y^M, \alpha^M)\}$, and $Q=\{(q_x^1, q_y^1, \beta^1), \ldots, (q_x^N, q_y^N, \beta^N)\}$, where $(p_x^i, p_y^i, \alpha^i)$ and $(q_x^j, q_y^j, \beta^j)$ are the features, i.e., the position and orientation associated with the ith minutia in P and the jth minutia in Q, M and N are the number of the detected minutiae of P and Q, respectively. The generalized Hough transform aligns P against Q by determining the translation parameters $\Delta x$ in x axis and $\Delta y$ in y axis, and the rotation parameter $\theta$. It first discretizes the parameter space into a lattice with $\theta \in \{\theta_1, \ldots, \theta_I\}$, $\Delta x \in \{\Delta x_1, \ldots, \Delta x_J\}$, and $\Delta y \in \{\Delta y_I, \ldots, \Delta y_K\}$. Each combination $\{\Delta x_i, \Delta y_j, \theta_k\}$ is called a lattice bin. Then, for each minutia in P and every minutia in Q, it computes the transformation parameters $\{\Delta x, \Delta y, \theta\}$ by $$\Theta = \beta^j - \alpha^i \quad (1)$$

and $$\begin{pmatrix} \Delta x \\ \Delta y \end{pmatrix} = \begin{pmatrix} q_x^j \\ q_y^j \end{pmatrix} - \begin{pmatrix} \cos\theta & -\sin\theta \\ \sin\theta & \cos\theta \end{pmatrix} \begin{pmatrix} p_x^i \\ p_y^i \end{pmatrix} \quad (2)$$

and quantizes them into the above mentioned lattice. Each set of the quantized parameters obtained is said to be one 'evidence' of the corresponding lattice bin. The generalized Hough transform counts the number of evidences for each bin in the lattice and finally specifies the parameters of the lattice bin that corresponds to the maximum number of evidences as the parameters for the (actual) registration.

While the generalized Hough transform is efficient in computation and works well in many cases, even on partial information of prints, it suffers from an inherent problem that limits its performance. To make the registration accurate, it is desirable to use a relatively small size of lattice bins. This, however, will result in a low maximum evidence count, which means that the alignment will be less reliable. On the contrary, increasing the lattice bin size will lead to poor spatial resolution and thereby low registration accuracy.

In the inventive AFIS, the standard generalized Hough transform is modified such that it can simultaneously overcome the above-mentioned problem, and yet retain the major advantages of the Hough transform. The modification is as follows. 1) A sufficiently large lattice bin size is chosen experimentally to ensure that enough evidences can be accumulated within a bin. 2) The number of evidences for each of the bins of the lattice is counted as is done in the generalized Hough transform. 3) The lattice is shifted in the x and y directions at a predetermined step size, and further, the number of evidences for each bin of the shifted lattice is counted. The shifting and counting processes are repeated and stops until a bin at the final position of shifting is overlapped completely with its diagonal neighbor at the position before the shifting process. Note that shifting the lattice essentially partitions each bin into blocks. In a direction, each block has the same size as the shift step. 4) For each shift, each block is assigned a number equal to the counts of evidence of the bin in which the block is contained. 5) All such numbers of the overlapped blocks for each block position are summed, and the transform parameters are specified as the position parameters of the block that corresponds to the maximum sum.

Testing was performed for the various bin and shifting step sizes with as many prints as possible so as to determine the best translation and rotation parameters. Currently, the bin size is $\Delta x=16$ pix, $\Delta y=16$ pix, and $\theta=10°$. The step size of shifting is 4 pix in both the x and y directions. These values however may be changed because they are relevant to the fingerprint sensor used in a system.

The advantage of this approach, as compared with the ordinary generalized Hough transform, is that the registration accuracy and reliability now are determined by shift step and bin size, respectively, which overcomes the shortcomings mentioned previously. The accuracy of registration is increased by decreasing the shift step size while simultaneously maintaining the reliability. Although this approach adds some computations, application tests verified that it is suitable for real-time applications.

The matching score computation unit 42 provides the final numerical figure that determines if the input print belongs to an authorized person by comparing the score against a predetermined security threshold value. To overcome the problems in the traditional art, the invention incorporates a method of computing a matching score that is more reliable and has a much improved discrimination capability. This method exploits the features of the above approach for fingerprint registration using shifted lattices. It was found that although the number of matched minutia between two non-matching prints can be relatively high, the distribution of the evidence counts over the lattices can be largely different from that of two matching prints. For non-matching prints, the maximum value of evidence counts is low while the variance of the parameters of the lattice bins corresponding to the maximum evidence counts is large (usually more than one bins have the maximum evidence counts). In addition to using the number of matched minutia, the method takes into consideration these two factors in the computation of the final matching score.

Sigmoid nonlinear functions are used to weigh the contribution of each of the three factors.

$$S = \sigma(w_m(m-m_0))\sigma\left(w_v\left(\frac{1}{v-v_0}\right)\right)\sigma(w_D(D-D_0))\sqrt{\frac{D^2}{MN}}, \quad (3)$$

where m is the maximum value of evidence counts, v is the variance of the parameters of the lattice bins corresponding to the maximum evidence counts, D is the number of the matched minutiae, M and N are the number of the detected minutiae in the current and template prints, and $w_m$, $w_v$, $w_D$, $m_0$, $v_0$ and $D_0$ are prespecified parameters determined by experiments, respectively.

$$\sigma(\circ) = \frac{1}{1 + \exp(-(\circ))}$$

is the sigmoid function.

Experimental tests confirmed that this formulation provides much better discrimination between matched and unmatched pairs than the traditional computation of matching score. Also, this improvement could be achieved with almost no extra computations.

The declared AFIS system can be used for both one-to-one matching as well as for one-to-many matching against database prints of authorized persons. As an example of the matching speed, the correct identification of an individual from a database of about 100 persons will take less than 1.5 seconds, while a one-to-one matching will take only about 0.4 second (using a Pentium Pro 200 processor). The system is also very robust to variations in input fingerprints. For example, the system can still correctly authenticate a person with an input fingerprint that is of low captured quality, and with some portions of the print removed.

Some applications of the invention include but are not limited to the following: secured transactions (e.g., using credit card for Internet banking and retailing, and for user authentication in automated teller machines); secured access control (e.g., lift and door access in buildings, and computer or network access without using passwords or cards); secured database systems (e.g., medical database of patients, nation-wide database for immigration and identification control; time-stamping database of workers in a company, and logistic database for controlling equipment checkout, or for monitoring movements of prisoners).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A finger print minutiae extraction method comprising:
   acquiring fingerprint image data;
   partitioning said fingerprint image data into at least one data block corresponding to a local area of said image data;
   generating a histogram function of a contrast level of said image data corresponding to said at least one data block, wherein a histogram of pixel intensity on a pixel by pixel basis is generated for said at least one data block;
   performing a histogram transformation of said histogram function,
   wherein said histogram transformation is adapted to the contrast level of said local area of said fingerprint image data and pre-enhanced fingerprint image data is generated with local enhancement.

2. The method of claim 1, further comprising:
   partitioning said fingerprint image data into a plurality of data blocks, each of said plurality of blocks corresponding to a different local area of said image data and at least one of said plurality blocks having a contrast level different than a second of said plurality of data blocks,
   wherein said histogram transformation is adapted to said different contrast levels of said plurality of blocks and pre-enhanced fingerprint image data is generated with local enhancement for a plurality of local areas of said image data.

3. The method of claim 1, wherein said histogram transformation includes using an objective function with a relatively high value at both endpoints of an intensity interval and a relatively low value at a middle of said intensity interval.

4. The method of claim 1, wherein noise and distortions in said image data are reduced.

5. The method of claim 1, wherein said histogram transform maps said histogram function to a specific function according to a mapping algorithm including
   wherein f(x) is a target histogram function and said target histogram function has low value at the mid-point and has a high value at the endpoint of the interval.

6. The method of claim 1, further comprising:
   performing orientation filtering on said pre-enhanced data using directional convolution for two dimensional digital image processing,
   wherein said pre-enhanced image data is smoothed and enhanced.

7. The method of claim 6, wherein the following algorithm is used in said orientation filtering.

8. The method of claim 1, further comprising:
   thinning said fingerprint image data to remove false connections of ridges in said data,
   wherein said thinning includes applying a first table and a second table to a plurality of pixels using an algorithm.

9. The method of claim 1, further comprising generating a first table and a second table using rules for character data and biological data.

10. The method of claim 9, wherein said rules for biological data include
    If P1*P7*P8=1 and P2+P6>0 and P3+P5=0 then LUT1 (P)=0;
    If P5*P6*P7=1 and P4+P8>0 and P1+P3=0 then LUT1 (P)=0;
    If P1*P2*P3=1 and P4+P8>0 and P5+P7=0 then LUT2 (P)0; and
    If P3*P4*P5=1 and P2+P6>0 and P1+P7=0 then LUT2 (P)=0,
    wherein A(P) is a number of 0–1 patterns in an order set P1, P2, P3, P4, P5, P6, P7, P8, P1, where Pi, i=1, . . . , 8, are 8-neighbors of a pixel in a clockwise direction, and B(P) is a number of nonzero neighbors of P.

11. A finger print minutiae extraction method comprising:
    acquiring fingerprint image data;
    partitioning said fingerprint image data into at least one data block corresponding to a local area of said image data;
    generating a histogram function of a contrast level of said image data corresponding to said at least one data block;
    performing a histogram transformation of said histogram function,
    wherein said histogram transformation is adapted to the contrast level of said local area of said fingerprint image data and pre-enhanced fingerprint image data is generated with local enhancement.

* * * * *